United States Patent [19]

Kish et al.

[11] Patent Number: 4,963,430
[45] Date of Patent: Oct. 16, 1990

[54] CORROSION AND SPLIT RESISTANT PLASTIC MATERIALS

[75] Inventors: Frederick A. Kish, Lockport; Parimal M. Vadhar, Prospect Heights, both of Ill.

[73] Assignee: Illinois Tool Works Inc., Glenview, Ill.

[21] Appl. No.: 294,325

[22] Filed: Jan. 6, 1989

[51] Int. Cl.$^5$ .............................................. C08L 67/02
[52] U.S. Cl. ...................................... 428/220; 525/64; 525/166; 525/177; 428/910
[58] Field of Search .................... 525/166, 177, 64; 428/910, 220

[56] References Cited

U.S. PATENT DOCUMENTS

| | | | |
|---|---|---|---|
| 3,354,023 | 11/1967 | Dunnington | 428/220 |
| 3,579,609 | 5/1971 | Sevenich | 525/177 |
| 3,944,699 | 3/1976 | Mathews | 525/177 |
| 4,368,295 | 1/1983 | Newton | 525/166 |
| 4,771,108 | 9/1988 | Mackenzie | 525/92 |

*Primary Examiner*—Patricia Short
*Attorney, Agent, or Firm*—Neal C. Johnson; John P. O'Brien; Donald J. Breh

[57] ABSTRACT

A flexible oriented plastic sheet of high tensile strength and which is resistant to corrosion and highly resistant to splitting when penetrated by a pointed article. The flexible oriented sheet of the invention can be cut into desired shapes and sizes so as to be useful in a variety of applications, such as roofing batten bars and fencing materials, which require high resistance to splitting and fastener pull-through. The sheets are produced by melt extruding and orienting a composition comprising a major amount of polyethylene terephthalate (PET) and a minor amount of a polyolefin, preferably polypropylene.

9 Claims, 1 Drawing Sheet

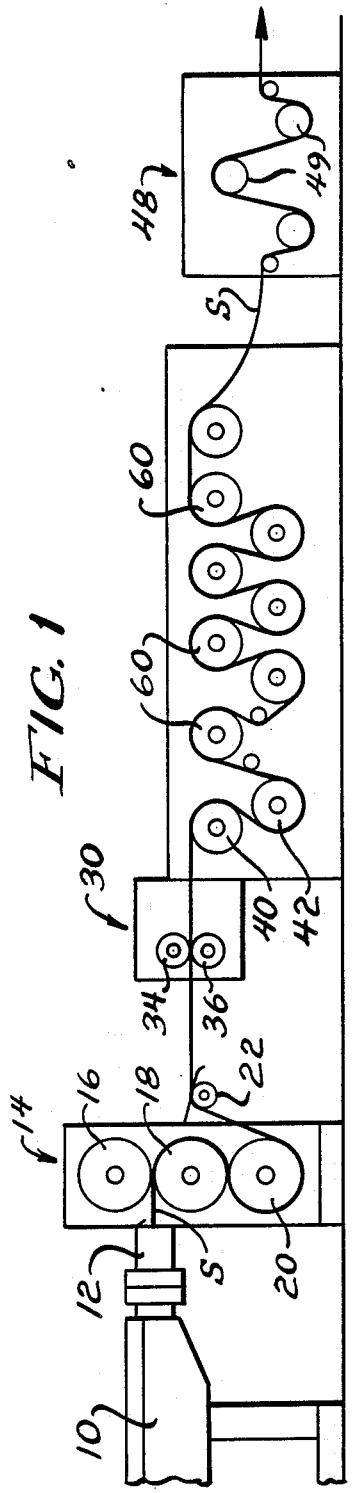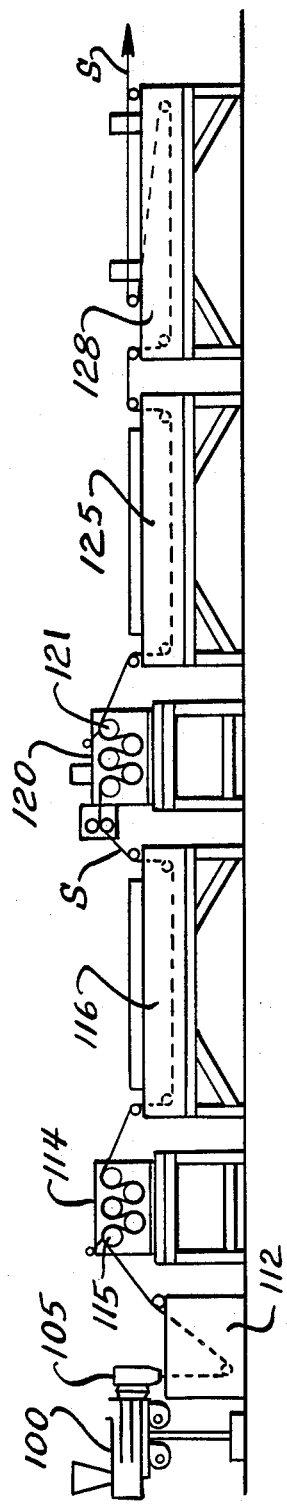

CORROSION AND SPLIT RESISTANT PLASTIC MATERIALS

This invention relates to flexible, corrosion and split-resistant plastic materials. More particularly, the invention relates to products prepared from compositions containing polyethylene terephthalate, which products can be cut to desired size and used in various applications requiring a flexible material exhibiting high tensile strength, resistance to corrosion and resistant to splitting when penetrated by pointed articles.

Lightweight, flexible materials used in the form of sheets, strips or straps having high tensile strength, resistance to corrosion and which do not tend to split when penetrated by pointed articles, such as mechanical fasteners, are useful in many applications. For example, it is well known to use battens in roof construction. Battens are strips or bars which are used to secure or hold down materials on building roofs. In constructing roofs, particularly large flat roofs, one or more flexible cover membranes, such as thermoplastic or elastomeric sheets, are placed over a rigid substrate to form a part of the roof structure. The flexible membranes serve as a barrier to seal the roof structure against liquid penetration and also may serve to provide an insulating effect. Such membranes are secured in place by use of batten strips or bars which are placed at spaced intervals over the flexible membrane. Headed fasteners, such as a screw or nail, are then passed downwardly through the batten strips and the membranes to secure the battens and barrier membranes to the roof substrate. The batten strips should be of such nature as to permit a pointed headed fastener to pass directly therethrough or through pre-drilled holes without destroying the hold-down effectiveness of the batten bar. Under certain conditions wind can uplift the membrane causing it to pull upwardly away causing the batten strip to rip or tear about the fastener with the headed fasteners pulling through the batten strip so as to no longer secure either the membrane or the batten to the roof substrate. Thus, batten bars, to be satisfactory, must exhibit high pull-through resistance. Batten bars must also exhibit a certain rigidity so as not to unduly curl, kink or distort when penetrated by a headed fastener.

Generally speaking, batten bars useful in roof construction desirably are light in weight and resistant to corrosion and have good tensile strength. Very importantly, a roofing batten bar should resist splitting and exhibit high resistance to the head of the fastener pulling through the bar (pull-through). The thickness, length and width of the batten bar can be widely varied depending upon use application.

Flexible plastic materials having high tensile strength, corrosion resistance and good resistance to a fastener head pull-through as well as good split resistance also find utility as fencing materials. Strips of such a plastic material of desired length can be fastened to connecting or support members by headed fasteners to form flexible snow fences and other type fences. Such flexible plastic materials in the form of strips can also be used to secure insulation to a substrate in a building or to secure flashing on buildings.

The present invention relates to a flexible oriented plastic sheet of high tensile strength and which is resistant to corrosion and highly resistant to splitting when penetrated by a pointed article. The flexible oriented sheet of the invention can be cut into desired shapes and sizes so as to be useful in a variety of applications, such as roofing batten bars and fencing materials, which require high resistance to splitting and fastener pull-through.

FIG. 1 of the drawings shows diagrammatically a typical "roller drawing" orientation process.

FIG. 2 of the drawings shows diagrammatically a typical "draw only" orientation process.

Preferred sheet products of the invention have an ultimate tensile strength of at least 25,000 pounds per square inch, a tensile modulus of at least about $1 \times 10^6$ pounds per square inch, an elongation of about 20% and a pull-through resistance of at least about 8 pounds per mil thickness.

The flexible oriented sheets of this invention are produced by melt extruding and orienting a composition comprising a major amount of polyethylene terephthalate (PET) and a minor amount of a polyolefin, preferably polypropylene. Preferably, a minor amount of a carboxylated olefin is included in the extruded composition. Optionally, the composition can also include a small amount of an elastomer and/or small amounts of pigments, such as titanium dioxide, or other colors and/or fillers, such as talc, mica, calcium carbonate and silica, to provide color or opaqueness to the sheets.

Generally, the extrudable compositions comprise from about 80 to 97% by weight of polyethylene terephthalate and from about 3 to 20% by weight of a polyolefin. Preferred compositions also include from about 1 to 5% by weight of a carboxylated polyolefin and, if desired, small amounts of an elastomer. Fillers, such as titanium dioxide, can also be employed in the composition in amounts of 0.1 to 3% by weight.

A particularly preferred composition of the invention is one comprised of about 92% by weight of polyethylene terephthalate, 6% polypropylene, 0.80% by weight of maleic anhydride grafted polypropylene and about 1.2% by weight ethylene-propylene rubber.

The major component of the composition, polyethylene terephthalate (PET), can be produced by the condensation reaction of terephthalic acid and ethylene glycol or dimethyl terephthalate and ethylene glycol. The preferred polyethylene terephthalate is one having an intrinsic viscosity of between about 0.56 to 1.2, and more preferably about 0.84. Polyethylene terephthalate copolyester compositions consist of cyclohexane dimethanol (CHDM), and ethylene glycol can also be used in place of polyethylene terephthalate. This is a slow crystallizable copolyester of cyclohexane methanol. Methods for preparing polyethylene terephthalate resins are well known and these resins are commercially available, usually in the form of pellets. Suitable commercially available polyethylene terephthalate resins for use according to this invention are, for example, PET 9506 and PET copolyester 8406 available from Goodyear Tire & Rubber Company, Akron, Ohio and PET copolyester 9922 available from Eastman Chemical Products, Inc., Kingsport, Tennessee.

The carboxylated polyolefin (preferably a carboxylated polypropylene) can be prepared by the oxidation of a polyolefin, preferably polypropylene, with an oxidizing agent to introduce carboxyl groups onto the polyolefin chain. Alternatively, the carboxylated polyolefin can be prepared by copolymerizing an olefin (preferably propylene) with an olefinically unsaturated acid or anhydride such as acrylic acid, maleic acid or maleic anhydride. The carboxylated polyolefin serves to improve the compatibility of polypropylene and the polyethylene terephthalate resin. There are commercially available products which comprise polypropylene, a carboxylated polyolefin and an impact resistance agent such as "Admer" available from Mitsui Chemical Company of Japan and "Bynel" available from Du Pont Chemical Company.

If desired, the composition cam include an elastomer which improves impact resistance. Various elastomeric additives well known in the art to be useful for improving impact resistance of olefin polymers and polyesters can be included in the compositions of this invention, if desired.

The plastic sheets according to this invention are prepared by melt extruding a blend of the specified components to form a sheet and then orienting the sheet to effect primarily mono-axial orientation. Preferably, the composition is extruded in the form of sheets of a thickness at least twice that of the desired final product. The extruded sheet is then oriented and cut to desired length and width.

Several procedures can be employed for orienting the sheets in accordance with this invention. One such process can be referred to as a "roller-drawing" orientation process. In this process, the sheet is oriented by being "pulled" through a narrow gap between rotating mill rolls. Orientation is due to both the squeezing action of the rolls, and the drawing action from pulling. The gap between the rolls of the mill is typically 20-25% of the sheet thickness. The width of the sheet changes very little in this process, since its dimension is confined by the mill. Therefore, it has substantially a planar monoaxial orientation. An advantage of the roller-drawing process is that it is well suited to handle a wide sheet and it yields a sheet very uniform in thickness since the sheet is sized by mill gap.

Another suitable orientation process is a "draw-only" process in which strands or a narrow width sheet of a desired composition are extruded and quenched into a fluid bath. Orientation is performed by stretching the suspended strands (or narrow width sheets) between two sets of rollers rotating at different speeds. The strands are heated in a fluid bath or in a convection oven during the orientation. This orientation process reduces the material in both width and thickness and achieves substantially uniaxial orientation.

A typical "roller drawing" orientation process for preparing products in accordance with the invention is schematically shown in FIG. 1 of the drawings, although other similar processes can be used. With reference to FIG. 1, a conventional plastic extruder is fed a blend of a composition described heretofore. Preferably the polyethylene terephthalate is dried to a moisture content of less than 005%. The composition is rendered plastic or flowable by heating to a sufficient temperature, say approximately 520° F. to 550° F. The composition is extruded through a conventional sheet die 12 at a back pressure of approximately 2000 pounds per square inch to extrude a web or sheet S having a suitable width and a suitable thickness, which is usually at least about twice the thickness of the final oriented sheet. For fence strips, a thickness on the order of 20 to 50 mils is generally satisfactory. For the production of roof batten strips a thickness on the order of about 15 to 170 mils is suitable. Thus, the thickness of the extruded sheet S leaving the extruder will be at least twice the thickness of the final battens or fence strips. A typical extruded sheet for use in the preparation of roof batten strips will be of the order of 30 inches wide. This size sheet will eventually result in production of 0.030 inch thick batten strips and can be slit to one inch width.

The sheet S is passed through a conventional casting roll assembly 14 comprising an upper roll 16, a middle roll 18 and a bottom roll 20, Preferably, rolls 16, 18 and 20 are maintained at a temperature of about 70° F., 90 F. and 80 F., respectively. For this purpose, the rolls may contain internal passages allowing the circulation of a heat transfer fluid therethrough.

The sheet is then passed over guide roll 22 to a rolling mill assembly 30 which includes a pair of opposed, oppositely rotating compression rolls 34 and 36. The compression rolls may be of conventional design for causing flow of the material in the sheet S in the direction of the feeding of the sheet. The compression rolls have a gap such that the cross-sectional thickness of the sheet S is considerably reduced, at least by ½. The compression rolls are preferably maintained at a temperature of about 200° F.

The sheet S exiting from the rolling mill assembly 30 is next trained about a pair of oppositely rotating rollers 40 and 42 which are maintained at a temperature of about 77° F. The rollers 40 and 42 constitute a first stretching bridle assembly and rotate at a speed similar to and somewhat higher than the upstream compression rolls 34 and 36 to provide a draw ratio of about 1.0 to 1.2 on the sheet. This slight stretching of the sheet S further orients the sheet in the direction of travel. The oriented sheet S leaving the first stretch bridle passes over a series of rolls 60 which constitute a second stretch bridle assembly and function to maintain the oriented sheet in tension at a draw of about 1.005. The sheet S is then passed to an annealing unit 48 wherein the sheet is conveyed by rollers 49 while being maintained at a temperature of about 250° F. which further sets the orientation of the sheet.

After heat conditioning, the oriented sheet can be stored on rolls or subjected to other operations such as scoring, folding, cutting, slitting, etc.

FIG. 2 shows substantially a typical "draw-only" orientation process. Referring to FIG. 2, a conventional plastic extruder 100 is fed a blend of a composition disclosed herein and strands or a sheet of narrow width are extruded through die 105 and quenched in a fluid bath 112. Orientation is achieved by then passing the extruded strips or strands through a control bridle assembly 114 in which the strip is passed over a series of rollers 1.5 rotating at a desired rate. The strands are then heated in heater 116 which can be a fluid bath or an oven. The strands are heated in heater 116 to a temperature of about 200° F.

The strand is then passed to stretch bridle assembly 120 in which it passes over a series of rollers 121 which rotate at higher speed than the rollers 115 in the control bridle. Preferably, the rollers 121 rotate 6 or 7 times faster than the rollers 115. This effects a drawing or stretching action on the extruded strand. The strand is then passed through a tank 125 of fluid maintained at a temperature of about 250° F. and then through a second tank 128 of fluid maintained at a temperature of 80° F.

The following examples further illustrate the advantages of the invention. To evaluate materials in the following examples a pull-through test procedure and a dropweight effect test were conducted.

The pull-through test procedure was as follows:

One inch wide and 26 inches long extruded and oriented battens of various compositions were prepunched with three holes (210 inch in diameter) at 1 inch, 13 inches and 25 inches measured from one end, matching the specifications of placing fasteners into battens on roofs at 12 inches on center.

The batten was placed on a test fixture. The outboard holes were slipped over posts that matched the hole diameter and simulated "/fastening". The center hole was placed over an opening in the fixture. A standard ROOFGRIP R Fastener #12 with a #3 Phillips head style was placed into this center hole with the head resting on the batten. A Phillips drill bit forced this fastener through the material at a speed of 1 inch per minute. The force value required to push-through the batten material was recorded in pounds. Fastener dimensions were: head diameter 0.425"–0.448", shank diameter 0.165"–0.167", thread diameter 0.209"–0.215".

The drop-weight split test procedure was as follows:

This is a dynamic test which always produces split without gross yielding. The test procedure is similar to puncture test of film by falling dart. It utilizes a sheet specimen of 6×6 inch. A ⅜ inch hole is punched in the center of the sheet, and then the hole is notched or cut with a sharp razor blade on either side along machine direction of the sheet. The specimen is mounted on a sheet mounting ring, where it is clamped tightly. A dart with varying weight is dropped from a selected height. The weight of the dart is increased if there is no failure, and it is decreased if there is a failure in the sheet specimen. Totally 20 specimens are tested to determine minimum weight required for failure. A specimen is considered to have failed the test by observing even a minor propagation or extension in the crack.

EXAMPLE 1

Composition A comprised 100% polyethylene terephthalate (PET) having an intrinsic viscosity of 0.95 (PET 9506 sold by Goodyear Tire and Rubber Company). Composition B comprised 92.8% polyethylene terephthalate, 0.2% titanium dioxide filter, 6% polypropylene, 0.4% carboxylated polypropylene, 0.6% ethylene-propylene rubber. Following the procedure described with reference to FIG. 1, these compositions were extruded into 115 mil thick sheets and then compressed in a roll mill and passed through a stretching bridle. The oriented sheets were heat set at 250° F. The thickness of the extruded sheets was reduced considerably, as shown. The properties of the two compositions are shown below. The oriented sheet of Compositions B exhibited excellent split resistance when compared to split resistance of Composition A.

| COMPOSITION | SHEET THICKNESS (INCH) | TENSILE STRENGTH (KPSI) | PULL-THROUGH (LBS) | MINIMUM DART WEIGHT FOR SPLIT (GMS) |
|---|---|---|---|---|
| A | .025 | 60 | 250 | 100 |
| B | .025 | 60 | 222 | 750 |

EXAMPLE 2

Composition A comprised 100% polyethylene terephthalate (PET 8406 sold by Goodyear having an intrinsic viscosity of 0.84. Composition B comprised 96% polyethylene terephthalate, 3% polypropylene, 0.40% carboxylated polypropylene and 0.60% ethylene-propylene rubber. Composition C comprised of 92% polyethylene terephthalate, 6% polypropylene, 0.8% carboxylated polypropylene and 1.20% ethylenepropylene rubber. Composition D comprised of 88% polyethylene terephthalate, 9% polypropylene, 1.2% carboxylated polypropylene and 1.8% ethylene-propylene rubber.

Properties of the above extruded and mono-axially oriented compositions are shown in Table 1.

TABLE 1

| COMPOSITION | TENSILE MODULUS (PSI) | TENSILE STRENGTH (PSI) | ELONGATION (%) | PULL-THROUGH (LBS) | MINIMUM DART WEIGHT (GMS) |
|---|---|---|---|---|---|
| A | $1.56 \times 10^6$ | 41,000 | 22 | 276 | 55 |
| B | $1.50 \times 10^6$ | 41,000 | 22 | 254 | 90 |
| C | $1.42 \times 10^6$ | 38,000 | 25 | 232 | 90 |
| D | $1.20 \times 10^6$ | 37,000 | 26 | 236 | 65 |

EXAMPLE 3

Batten strips of varying composition were extruded and oriented by a processs described with reference to FIG. 1. The polyethylene terephthalate used was Eastman 9981 having an intrinsic viscosity of 0.66. Batten strip A was comprised of only polyethylene terephthalate. Composition B was comprised of 96% polyethylene terephthalate and 4% of an additive containing approximately 75% by weight of polypropylene, 10% by weight of carboxylated polypropylene and 15% by weight of ethylene-propylene rubber. Composition C comprised 92% polyethylene terephthalate and 8% of the same additive. Composition D comprised 88% polyethylene terephthalate and 12% of the additive. The extruded sheets of 110 mil thickness produced from the above four compositions were oriented by milling and stretching as described with reference to FIG. 1. Oriented sheets in 25 and 30 mil thickness were produced. Properties of the mono-axially oriented sheets are shown below.

| COMPOSITION | SHEET THICKNESS (INCH) | PULL-THROUGH VALUE (LBS) | SPLIT LENGTH (INCH) |
|---|---|---|---|
| A | 30 | 363 | 0.25 |
| B | 30 | 345 | 0 |
| B | 25 | 317 | 0 |
| C | 30 | 369 | 0 |
| C | 25 | 300 | 0 |
| D | 30 | 359 | 0 |
| D | 25 | 295 | 0 |

In this example, the split resistance of the sheets was investigated by examining formation of cracks around the pre-punched hole on completion of the pull-through test. A low intrinsic viscosity polyethylene terephthalate oriented sheet split readily and formed an average crack length of 0.25 inch. No splitting occurred in the oriented polyethylene terephthalate sheets containing the additive.

EXAMPLE 4

An oriented batten strip was produced from a composition comprising pure polypropylene. The polypropylene had a melt index of 1.5 and is commercially available from Exxon Corporation (PP 5052). Polypropylene was extruded in a 110 mil thick sheet. The sheet was then oriented by roll milling and stretching. The stretching rolls in the stretch bridle were maintained at 290o F. to orient and heat set the milled sheet. The oriented sheets in various thicknesses were produced by adjusting the mill gap and the speed of rotation of the rollers in the stretch bridle. Split resistance of the oriented sheets was investigated by driving a cone-shape needle into the sheet and measuring the length of the crack produced.

| PP SHEET THICKNESS (INCH) | SPLIT LENGTH ON PUNCTURE (INCH) |
|---|---|
| 0.030 | 0.5 |
| 0.025 | 1 |
| 0.020 | 1 |

The batten strip produced from a polypropylene alone had a very poor split resistance.

EXAMPLE 5

Composition A was comprised of only polyethylene terephthalate (Goodyear 8406 having an intrinsic viscosity of 0.84). Composition B was comprised of 93% polyethylene terephthalate, 6% polypropylene, 0.4% carboxylated polypropylene and 0.6% ethylene-propylene rubbers. Compositions C, D and E were comprised of polyethylene terephthalate with 4, 8 and 12% polypropylene (Eastman PP copolymer, Tenite P6E2A, 2 melt index), respectively. The extruded sheets of 110 mil thickness were oriented by roll-milling and stretching to obtain oriented sheets having a thickness of 30 mil. Properties of the oriented sheets are shown in the Table below:

| COMPOSITION | PULL-THROUGH (LBS) | PULL-THROUGH (LBS/MIL) |
|---|---|---|
| A | 411 | 10.3 |
| B | 400 | 10.0 |
| C | 349 | 10.0 |
| D | 334 | 9.0 |
| E | 307 | 8.0 |

The split resistance of the polyethylene terephthalate was enhanced by addition of polypropylene and carboxylated polypropylene.

Those modifications and equivalents which fall within the spirit of the invention are to be considered a part thereof.

What is claimed is:

1. A construction article adapted for attachment to a substrate or support element by a headed pointed fastening element comprising an extruded elongated strip substantially mono-axially oriented in the longitudinal dimension and having a thickness of at least 15 mils and a tensile strength of at least 25,000 pounds per square inch in the oriented direction and being resistant to splitting upon penetration by a headed pointed fastening element and being resistant to pull-through of the headed pointed fastening element, said extruded and oriented strip being formed of a composition of from about 80 to 97% by weight of polyethylene terephthalate and from about 3 to 20% by weight of a polyolefin.

2. A construction article in accordance with claim 1 wherein the polyolefin is polypropylene.

3. A construction article in accordance with claim 1 wherein the extruded composition also contains from about 1 to 5% of a carboxylated polyolefin.

4. A construction article in accordance with claim 1 wherein the extruded composition contains approximately 92% by weight of polyethylene terephthalate, 6% polypropylene, 0.80% maleic anhydride grafted polypropylene and 1.2% ethylenepropylene rubber.

5. A construction article in accordance with claim 1 wherein the strip is adapted to secure insulation to a substrate.

6. A construction article in accordance with claim 1 wherein the strip is adapted to secure flashing on a building substrate.

7. A roof batten adapted for attachment to a roofing substrate by a headed pointed fastening element comprising an extruded elongated strip substantially mono-axially oriented in the longitudinal dimension and having a thickness of at least 15 mils and a tensile strength of at least 25,000 pounds per square inch in the oriented direction and being resistant to splitting upon penetration by a headed pointed fastening element and being resistant to pull-through of the headed pointed fastening element, said extruded and oriented strip being formed of a composition of from about 80 to 97% by weight of polyethylene terephthalate and from about 3 to 20% by weight of a polyolefin.

8. A fencing material adapted for attachment to a support element by a headed pointed fastening element comprising an extruded elongated strip substantially mono-axially oriented in the longitudinal dimension and having a thickness of at least 20 mils and a tensile strength of at least 25,000 pounds per square inch in the oriented direction and being resistant to splitting upon penetration by a headed pointed fastening element and being resistant to pull-through of the headed pointed fastening element, said extruded and oriented strip being formed of a composition of from about 80 to 97% by weight of polyethylene terephthalate and from about 3 to 20% by weight of a polyolefin.

9. A fencing material in accordance with claim 8 wherein the strip has a thickness of about 20 50 mils.

* * * * *